May 24, 1960 J. ZIMMER, JR., ET AL 2,937,652
MEANS FOR DETACHABLY FASTENING A FLEXIBLE TOP TO A WINDSHIELD
Filed Sept. 8, 1958
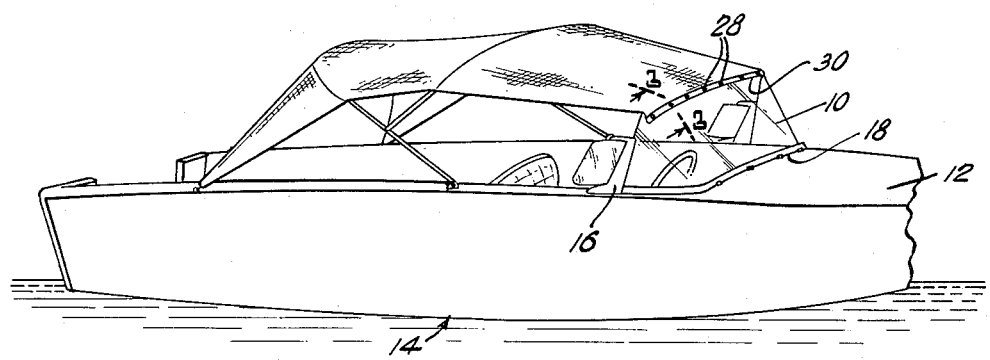
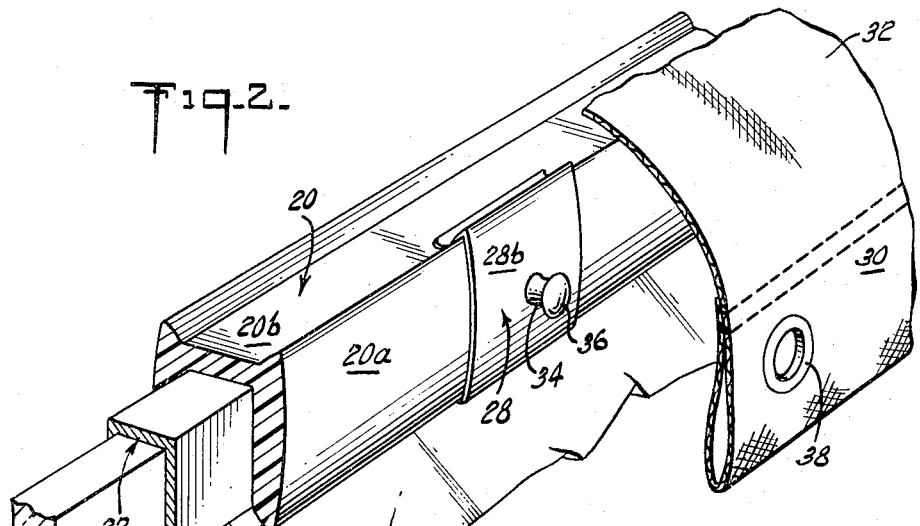
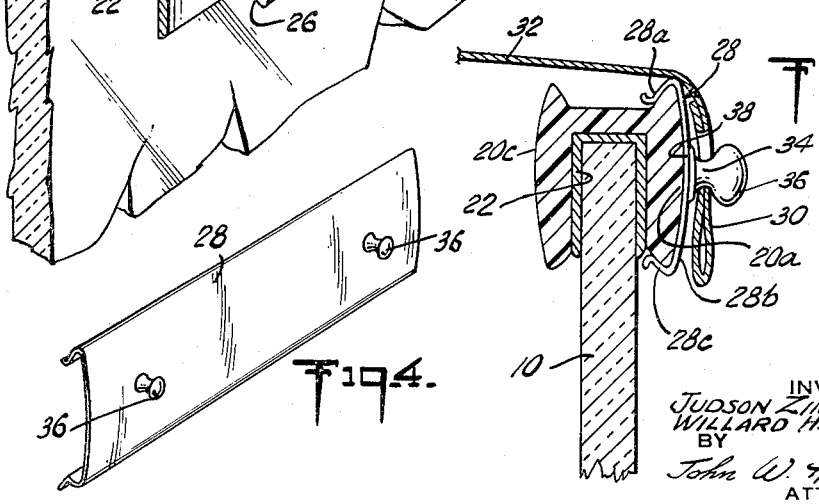
INVENTORS:
JUDSON ZIMMER JR
WILLARD H. TAYLOR
BY
John W. Hoag
ATTORNEY

United States Patent Office 2,937,652
Patented May 24, 1960

2,937,652

MEANS FOR DETACHABLY FASTENING A FLEXIBLE TOP TO A WINDSHIELD

Judson Zimmer, Jr., and Willard H. Taylor, Gloversville, N.Y., assignors to Nelson A. Taylor Co., Inc., Gloversville, N.Y., a corporation Filed Sept. 8, 1958, Ser. No. 759,736

4 Claims. (Cl. 135—6)

This application relates to method and means for detachably fastening a flexible top or cover to a windshield.

An application of the invention particularly contemplated is for fastening the front edge of a removable or collapsible top along the upper outside edge of windshield assemblies of the kind used on boats and particularly power boats equipped with windshields of the wrap-around type. Such windshields are not mounted in a frame but are secured only along their lower edges and at the extremities of their bent back ends.

A particular problem is presented in providing means for interconnecting a flexible removable boat top, of canvas or the like, to windshields of the wrap-around kind, and it is an object of this invention to provide simple means for accomplishing this end.

Another object of the invention is to provide means which may be mounted on a windshield of the wrap-around type co-acting with fastening means carried by the removable top, which will itself be readily removable from the windshield when the top is removed, or folded into inoperative position.

The invention will best be understood if the following description is read in connection with the drawings in which:

Figure 1 is a perspective view showing a windshield of the wrap-around type mounted across the deck of a power boat with a removable top secured along its front margin to the top margin of the windshield.

Figure 2 is a detail perspective view, partly in cross-section of a portion of a windshield having fastening means thereon which may be selectively positioned along the top of the windshield, and with a portion of a flexible top extending over the windshield top in a position to be engaged with the said fastening means carried by the windshield.

Figure 3 is a side view of a cross-section taken on the line 3—3 of Figure 1, and Figure 4 is a perspective view of a spring clip having a plurality of fastener means thereon, and having an end portion extended with a reverse curve so that it is angled outwardly.

In the embodiment of the invention shown in the drawing, a windshield 10 of the wrap-around kind is mounted across the deck 12 of a boat 14, by means of the brackets 16 which are mounted on the deck and engage the extremities of the rearwardly extending end portions of the windshield, and by means of the strip 18, which may be of rubber, neoprene, vinyl, or the like, and has a portion engaging the lower edge of the windshield and a portion fastened to the boat deck 12. The mounting strip may be of known kind and so is not further described herein but preferably it is of the kind which is disclosed and claimed in the co-pending U.S. patent application of Willard H. Taylor, Serial No. 761,233, filed September 15, 1958.

On the top edge of the windshield 10, extending down for a distance over the inside and outside faces of the windshield as well as across the top, is the trim strip 20, which may be of any suitable material such, for example, as chrome steel, having the intermediate portion 20b which extends across the top of the windshield intermediate the portion 20a, which extends down for a distance over the outer face of the windshield, and the portion 20c which extends down a distance over the inner face of the windshield.

The trim strip 20 is secured on the top of the windshield in any suitable way. As shown herein an interliner strip 22 of any suitable material is provided between the top of the windshield and the trim strip, and the trim strip is press fitted on and over the top edge of the windshield and over the interliner 22.

At least the outer face 20a of the trim strip is characterized by being extended both upwardly, above the top surface of the intermediate portion 20b of the strip, and below the inner surface of portion 20a thus forming the upwardly extending ridge 24 and the downwardly extending ridge 26. Clips 28 are provided for mounting over the outer face 20a of the trim strip. These clips are spring clips and comprise an intermediate portion 28b which is slightly arched, and the end portions 28a and 28c. The inner surface of the end portions of the clips are angled inwardly but at least one of said end portions is extended and bent with a reverse curve so that its outer extremity is angled outwardly and disposed outwardly from the adjacent end of the intermediate portion, as shown in Figure 4. On the outer face of each clip fastener means are provided for co-acting with means provided along an edge or hem 30 of a flexible top 32. The specific means illustrated herein is a projection 34 extending outwardly from the intermediate face 28b of the clip and having the enlarged outer end portion or head 36 adapted to project through and engage an eyelet 38 provided in the hem portion 30 of the removable top 32.

The spring clip 28 is so designed as to easily snap over the outer face of the windshield trim strip and sufficient tension is given the spring clip so that it will remain in position on the windshield even when a flexible top to which it is engaged is in a relaxed state. When the top 32 is drawn tight the tension of the top holds the spring clips against the top trim. When the top 32 is removed or folded down the spring clips 28 may be detached from the trim strip 20 and stowed away with the top.

It will be obvious that the position of the members 34 and 38 may be reversed and that an eyelet or equivalent may be provided on the outer face of clip 28 and a member projecting from the inner surface of the edge portion 30 of the top may be provided to engage in the means provided on the face of the spring clip. Or the spring clips may be sewed or otherwise attached on the inner surface of hem 30 of the top to be carried by the top. It is not intended that the invention be limited to the position or the particular form of the means by which the spring clips are attached to the top.

It will be understood that the attachment member or members which engage the trim strip may be initially mounted on the trim strip and then moved along it into position to engage coacting attachment means on the top, or the attachment means which engages the trim strip may be initially attached to the top and then engaged with the trim strip anywhere along the trim strip that is convenient.

The combination of elements comprising the specific fastening means shown herein has the advantage that there are no holes to drill either in the windshield or in the trim strip. No matching of the position and spacing of studs or the like provided along the top of the windshield with co-acting fastener parts on the top is required, since the studs are mounted on spring clips which can be moved longitudinally and selectively engaged along the top of the windshield. This arrangement facilitates attachment of the boat top to the windshield in the field, by the boat owner or user. And the fact that the clips are readily removable from the windshield when a top is not in use adds to the trim appearance of the windshield when the top is folded or in storage.

There has thus been provided an embodiment of the invention in which the above stated objects are attained in a thoroughly practical and successful manner.

What we claim is:

1. In a vehicle having a flexible top and a windshield which has an upper edge adapted to be connected with the top when the top is in raised position, co-acting means for detachably securing the top to the windshield including a trim strip mounted on the top edge of the windshield and characterized by having portions adapted to engage spring clip means and spring clip means engageable with the top and with said portions of the trim strip selectively along the trim strip.

2. Means for attaching a demountable boat top to a boat windshield which comprises, a spring clip pre-attached to the boat cover, and a trim strip affixed along the top of the windshield and having means coacting with said spring clip to inter-engage the spring clip when the spring clip is snapped over the trim strip anywhere along the length of the trim strip.

3. Means for attaching a detachable boat top to a boat windshield which comprises, a trim strip affixed along the upper edge of the windshield, and trim strip engaging means adapted for attachment to the top adjacent its front edge and engageable with the trim strip anywhere along at least a portion of the trim strip, the trim strip and said engaging means coacting to provide an interconnection adapted to resist inadvertent separation of the top from the windshield but separable in response to a force applied to said engaging means in a direction other than the upward direction in which the front of the top moves when disconnected and lifted from the windshield.

4. Means for attaching a detachable boat top to a boat windshield which comprises, a trim strip affixed along the upper edge of the windshield, and trim strip engaging means adapted for attachment to the top adjacent its front edge and engageable with the trim strip anywhere along at least a portion of the trim strip, and slidable along the trim strip, the trim strip and said engaging means coacting to provide an interconnection adapted to resist inadvertent separation of the top from the windshield but separable in response to a force applied to said engaging means in a direction other than the upward direction in which the front of the top moves when disconnected and lifted from the windshield.

References Cited in the file of this patent

UNITED STATES PATENTS

| 1,261,063 | Slater | Apr. 2, 1918 |
| 1,786,038 | Swanson | Dec. 23, 1930 |
| 2,277,742 | Crawford | Mar. 31, 1942 |
| 2,357,056 | Nelson | Aug. 29, 1944 |
| 2,833,296 | Woodruff | May 6, 1958 |
| 2,863,196 | Shears | Dec. 9, 1958 |